United States Patent
Skoog et al.

(10) Patent No.: US 6,177,370 B1
(45) Date of Patent: Jan. 23, 2001

(54) FABRIC

(75) Inventors: Henry Skoog; Fred R. Radwanski, both of Roswell; Terry R. Cleveland, Woodstock; Frances W. Mayfield, Marietta; Lawrence M. Brown, Roswell, all of GA (US)

(73) Assignee: Kimberly-Clark Worldwide, Inc., Neenah, WI (US)

( * ) Notice: Under 35 U.S.C. 154(b), the term of this patent shall be extended for 0 days.

(21) Appl. No.: 09/163,216

(22) Filed: Sep. 29, 1998

(51) Int. Cl.⁷ .............................. B32B 5/06; B32B 5/26; B32B 7/08
(52) U.S. Cl. .................. 442/387; 442/383; 442/384; 442/385; 442/389; 442/393; 442/400; 442/401; 442/403; 442/407; 442/408; 442/412; 442/413; 442/417
(58) Field of Search ..................... 442/383, 384, 442/385, 387, 389, 393, 400, 401, 403, 407, 408, 412, 413, 417

(56) References Cited

U.S. PATENT DOCUMENTS

| | | | |
|---|---|---|---|
| 4,196,245 | 4/1980 | Kitson et al. | 428/198 |
| 4,436,780 | 3/1984 | Hotchkiss et al. | 428/198 |
| 4,442,161 | 4/1984 | Kirayoglu et al. | 428/219 |
| 4,636,418 | 1/1987 | Kennard et al. | 428/110 |
| 4,755,421 | 7/1988 | Manning et al. | 428/224 |
| 4,808,467 | 2/1989 | Suskind et al. | 428/284 |
| 4,902,564 | 2/1990 | Israel et al. | 428/284 |
| 4,931,355 | 6/1990 | Radwanski et al. | 428/283 |
| 4,950,531 | 8/1990 | Radwanski et al. | 428/284 |
| 5,106,457 | 4/1992 | Manning et al. | 162/115 |
| 5,151,320 | 9/1992 | Homonoff et al. | 428/284 |
| 5,284,703 | 2/1994 | Everhart et al. | 428/283 |
| 5,459,912 | 10/1995 | Oathout | 28/105 |
| 5,573,841 | 11/1996 | Adam et al. | 428/219 |
| 5,587,225 | 12/1996 | Griesbach et al. | 428/198 |
| 5,652,049 | * 7/1997 | Suzuki | 442/387 |
| 5,874,159 | 2/1999 | Cruise et al. | 428/198 |

FOREIGN PATENT DOCUMENTS

| | | |
|---|---|---|
| 0233211 | 9/1989 | (EP) . |
| 0333210 | 9/1989 | (EP) . |
| 0492554 | 7/1992 | (EP) . |
| 0540041 | 5/1993 | (EP) . |
| 0557659 | 9/1993 | (EP) . |
| 96/25556 | 8/1996 | (WO) . |
| 98/55295 | 12/1998 | (WO) . |

OTHER PUBLICATIONS

PCT International Search Report, Mailed Mar. 2, 2000.

* cited by examiner

Primary Examiner—Terrel Morris
Assistant Examiner—Norca L. Torres
(74) Attorney, Agent, or Firm—Scott B. Garrison (57) ABSTRACT

The present invention desirably provides a fabric including a synthetic fiber structure first zone, a synthetic fiber structure second zone, and a short fiber third zone. The first zone may include a spunbond web layer and a meltblown web layer. The synthetic fiber structure second zone may be positioned proximate to the synthetic fiber structure first zone and the short fiber third zone may be positioned substantially between the first and second zones. Desirably, the first and second zones are entwined.

17 Claims, 5 Drawing Sheets

FABRIC

FIELD OF THE INVENTION

The present invention generally relates to hydraulically entangled nonwoven composite fabrics, and more specifically, hydraulically entangled fabrics having at least three layers and containing a continuous filament and a fibrous component, and a process for making the same.

BACKGROUND OF THE INVENTION

Hydraulically entangled nonwoven fabrics have many applications, such as tea bags, medical gowns, drapes, cover stock, food service, and industrial wipers. One type of hydraulically entangled nonwoven fabric may include two crimped spunbond layers sandwiching a cellulosic fiber layer. This fabric is primarily intended to be used as a launderable clothing material.

Although this fabric has advantages in applications such as clothing material, it has shortcomings in applications requiring abrasion resistance, such as, for example, industrial wipers. Consequently, using this fabric as an industrial wiper results in excessive lint particles and relatively low fabric durability. Another shortcoming is that manufacturing such fabric requires a bonding step after hydroentangling. This extra step may increase the cost of the fabric, and thus, reduce its desirability as an industrial wiper.

Accordingly, there is a need for a nonwoven fabric having at least three layers that has improved abrasion resistance and requires no additional bonding after hydroentangling.

DEFINITIONS

As used herein, the term "comprises" refers to a part or parts of a whole, but does not exclude other parts. That is, the term "comprises" is open language that requires the presence of the recited element or structure or its equivalent, but does not exclude the presence of other elements or structures. The term "comprises" has the same meaning and is interchangeable with the terms "includes" and "has", The term "machine direction" as used herein refers to the direction of travel of the forming surface onto which fibers are deposited during formation of a material.

The term "cross-machine direction" as used herein refers to the direction in the same plane which is perpendicular to machine direction.

As used herein, the term "zone" refers to a region or area set off as distinct from surrounding or adjoining parts.

As used herein, the term "synthetic fiber structure" refers to a fiber structure created from man-made materials such as petroleum distillates or regenerated or modified cellulosic materials. In most instances, synthetic fiber structures generally have a fiber length greater than about 0.01 meter. Examples of a synthetic fiber structure include nonwoven webs having petroleum distillate fibers, or semisynthetic regenerated cellulosic fiber structures, such as products sold under the trade designation RAYON®.

As used herein, the term "nonwoven web" refers to a web that has a structure of individual fibers which are interlaid forming a matrix, but not in an identifiable repeating manner. Nonwoven webs have been, in the past, formed by a variety of processes known to those skilled in the art such as, for example, meltblowing, spunbonding, wet-forming and various bonded carded web processes.

As used herein, the term "spunbond web" refers to a web formed by extruding a molten thermoplastic material as filaments from a plurality of fine, usually circular, capillaries with the diameter of the extruded filaments then being rapidly reduced, for example, by fluid-drawing or other well known spunbonding mechanisms. The production of spunbond nonwoven webs is illustrated in patents such as Appel, et al., U.S. Pat. No. 4,340,563.

As used herein, the term "meltblown web" means a web having fibers formed by extruding a molten thermoplastic material through a plurality of fine, usually circular, die capillaries as molten fibers into a high-velocity gas (e.g. air) stream which attenuates the fibers of molten thermoplastic material to reduce their diameters. Thereafter, the meltblown fibers are carried by the high-velocity gas stream and are deposited on a collecting surface to form a web of randomly disbursed fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al., which are hereby incorporated by reference.

As used herein, the term "short fiber" refers to any fiber having a length approximately less than 0.01 meter.

As used herein, the term "staple fiber" refers to a cut fiber from a filament. Any type of filamenting material may be used to form staple fibers. For example, cotton, rayon, wool, nylon, polypropylene, and polyethylene terephthalate may be used. Exemplary lengths of staple fibers may be from about 4 centimeter to about 20 centimeter.

As used herein, the term "filament" refers to a fiber having a large aspect ratio.

As used herein, the term "uncrimped" refers to an uncurled synthetic fiber as measured in accordance with ASTM test procedure D-3937-94 and is defined as less than two crimps per fiber.

As used herein, the term "cellulose" refers to a natural carbohydrate high polymer (polysaccharide) having the chemical formula $(C_5H_{10}O_5)_n$ and consisting of anhydroglucose units joined by an oxygen linkage to form long molecular chains that are essentially linear. Natural sources of cellulose include deciduous and coniferous trees, cotton, flax, esparto grass, milkweed, straw, jute, hemp, and bagasse.

As used herein, the term "pulp" refers to cellulose processed by such treatments as, for example, thermal, chemical and/or mechanical treatments.

As used herein, the term "thermoplastic material" refers to a high polymer that softens when exposed to heat and returns to its original condition when cooled to room temperature. Natural substances exhibiting this behavior are crude rubber and a number of waxes. Other exemplary thermoplastic materials include styrene polymers and copolymers, acrylics, polyethylenes, polypropylene, vinyls, and nylons.

As used herein, the term "non-thermoplastic material" refers to any material which does not fall within the definition of "thermoplastic material," above.

As used herein, the term "Taber abrasion" refers to values determined in substantial accordance with ASTM test procedure D-3884-92 and reported as described herein.

As used herein, the term "machine direction tensile" (hereinafter may be referred to as "MDT") is the force applied in the machine direction to rupture a sample in substantial accordance with TAPPI test procedure T-494 om-88 and may be reported as gram-force.

As used herein, the term "cross direction tensile" (hereinafter may be referred to as "CDT") is the force applied in the cross direction to rupture a sample in substantial accordance with TAPPI test procedure T-494 om-88 and may be reported as gram-force.

As used herein, the term "basis weight" (hereinafter may be referred to as "BW") is the weight per unit area of a sample calculated in accordance with ASTM test procedure D-3776-96, Option C, and may be reported as gram-force per meter squared.

As used herein, the term "gauge length" is the sample length, typically reported in centimeters, measured between the points of attachment. As an example, a fabric sample is tautly clamped in a pair of grips. The initial distance between the grips, generally about 7.6 or 10.2 centimeters, is the gauge length of the sample.

As used herein, the term "percent stretch" refers to values determined as described herein.

As used herein, the term "trap tear" refers to values determined in general accordance with TAPPI test procedure T 494 om-88 as described herein.

SUMMARY OF THE INVENTION

The problems and needs described above are addressed by the present invention, which desirably provides a fabric including a synthetic fiber structure first zone, a synthetic fiber structure second zone, and a short fiber third zone. The first zone may include a spunbond web layer and a meltblown web layer. The synthetic fiber structure second zone may be positioned proximate to the synthetic fiber structure first zone and the short fiber third zone may be positioned substantially between the first and second zones. Desirably, at least a portion of the first and second zones may be entwined with the third zone.

In addition, the short fiber third zone may include pulp fibers, staple fibers, particulates, and combinations of one or more thereof. Furthermore, the second zone may include a spunbond web layer and a meltblown web layer. Moreover, the first and second zones may be prebonded prior to being entwined.

In another embodiment, the short fiber third zone may include a plurality of cellulosic material layers. The synthetic fiber structure second zone may be positioned proximate to the synthetic fiber structure first zone and the short fiber third zone may be positioned substantially between the first and second zones. Desirably, at least a portion of the first and second zones may be entwined with the third zone.

Furthermore, the short fiber third zone may include three cellulosic material layers. In addition, the short fiber third zone may include pulp and staple fibers or particulates. Moreover, the first or second zone may include a spunbond web layer and a meltblown web layer.

A further embodiment of the present invention may be a process for producing a fabric. The process may include the steps of providing a prebonded synthetic fiber structure first zone, providing a synthetic fiber structure second zone, and providing a short fiber third zone. The third zone may be positioned substantially between the first and second zones. Desirably, the first and second zones may be hydroentangled.

Additionally, the short fiber third zone may include pulp fibers, staple fibers, or pulp fibers and staple fibers. Moreover, the second zone may include a spunbond web layer and a meltblown web layer.

In a further embodiment, the fabric may have a Taber abrasion value of not less than about 3 in substantial accordance with ASTM test procedure D-3884-92.

Furthermore, the short fiber third layer may include pulp fibers, staple fibers, pulp and staple fibers, and particulates. Desirably, the first layer is a nonwoven web layer, and more desirably, the nonwoven web layer is a spunbond web layer. Moreover, the first and second layers may be prebonded prior to being entwined.

Another embodiment of the present invention may be a fabric having a short fiber and a weight loss less than about 6 percent after 5 washing and drying cycles.

In yet a further embodiment, the first zone may include uncrimped fibers.

In a still further embodiment, the fabric may include a prebonded synthetic fiber structure first zone.

DETAILED DESCRIPTION OF THE INVENTION

Figure 1:
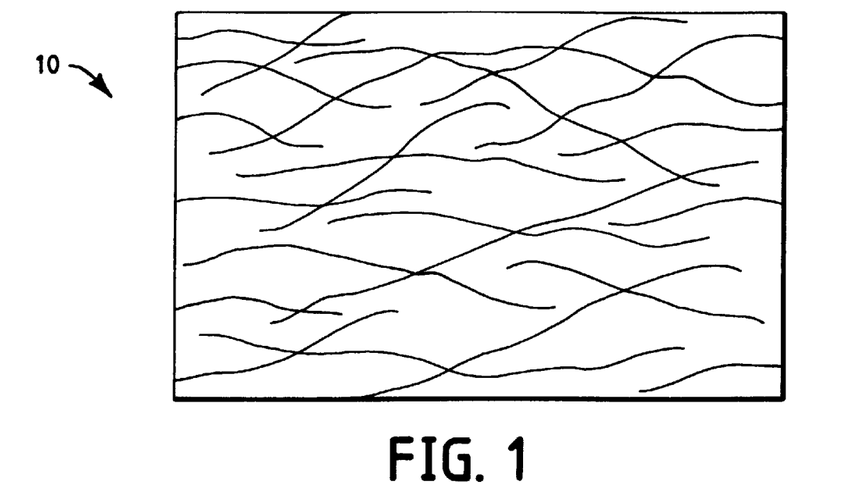
FIG. 1 is a top, plan view of a fabric of the present invention.
Figure 2:
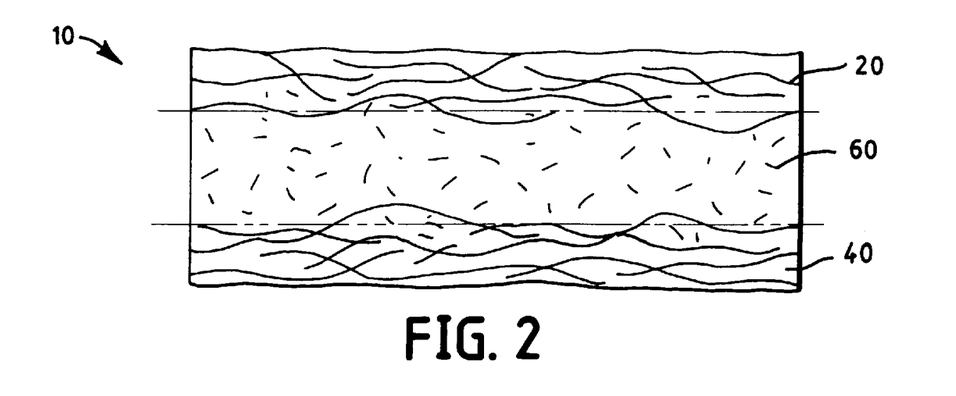
FIG. 2 is an enlarged cross-section of one embodiment of the fabric having three zones.

Referring to FIGS. 1 and 2, a fabric 10 may include three zones, namely, a synthetic fiber structure first zone 20, a synthetic fiber structure second zone 40, and a short fiber third zone 60. Although each zone 20, 40, and 60 makes a distinct layer, these zones 20, 40, and 60 may themselves include a plurality of layers. Desirably, the first zone 20 and second zone 40 are nonwoven webs, and more desirably, are spunbond webs. These zones 20 and 40 provide strength, durability, and abrasion resistance to the fabric 10. The short fiber third zone 60 may be wood pulp or staple fibers, or a mixture of both. The third zone 60 provides absorbency and softness to the fabric 10. Although three distinct layers are present in the fabric 10, some intermingling occurs between the different zones 20, 40, and 60.

The first and second synthetic fiber zones or layers 20 and 40 may have a basis weight from about 12 to about 50 gram per square meter (hereinafter referred to as "gsm") Moreover, the synthetic fiber layers 20 and 40 may have a basis weight from about 20 gsm to about 27 gsm. The third short fiber zone or layer 60 may have a basis weight from about 28 gsm to about 165 gsm. Furthermore, the short fiber layer 60 may have a basis weight from about 80 gsm to about 131 gsm. In addition, the short fiber layer 60 may have a basis weight from about 90 gsm to about 125 gsm.

Alternatively, the synthetic fiber layers 20 and 40 may range from about 10 to about 70 weight percent of the total fabric 10 weight, and correspondingly, the short fiber layer 60 may range from about 90 to about 30 weight percent of the total fabric 10 weight. Moreover, the synthetic fiber layers 20 and 40 may range from about 29 to about 33 weight percent of the total fabric 10 weight, and correspondingly, the short fiber layer 60 may range from about 71 to about 67 weight percent of the total fabric 10 weight. Furthermore, the total basis weight of the fabric 10 may range from about 52 gsm to about 250 gsm. In addition, the total basis weight of the fabric 10 may range from about 90 gsm to about 175 gsm.

The synthetic fiber layers 20 and 40 may include admixtures of other materials, such as short fibers, long fibers, synthetic fibers, natural fibers, particulates, binders, and fillers. Furthermore, the short fiber zone 60 may include admixtures of other materials, such as long fibers generally having a length greater than 0.01 meter, synthetic fibers, natural fibers, particulates, binders, and fillers.

Figure 3:
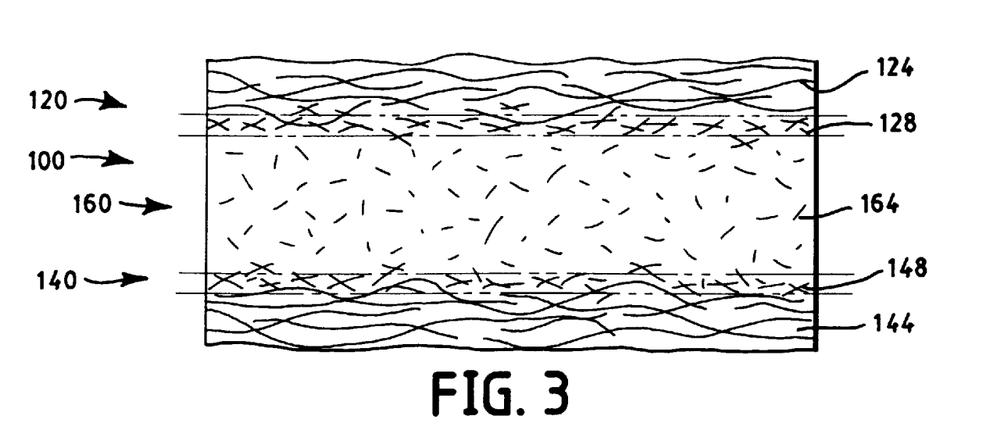
FIG. 3 is an enlarged cross-section of another embodiment of the fabric having five layers.

As shown in FIG. 3, an alternate embodiment of the present invention is a fabric 100 that may include three zones, namely, a synthetic fiber structure first zone 120, a synthetic fiber structure second zone 140, and a short fiber third zone 160. In this desired embodiment, the zones 120 and 140 may include nonwoven webs, and specifically, further include respectively, a first spunbond web layer 124 and a first meltblown web layer 128, and a second spunbond web layer 144 and a second meltblown web layer 148. The layers 124 and 144 provide strength, durability, and abrasion resistance to the fabric 100 while the layers 128 and 148 help prevent Tinting by trapping material from the third zone 160, and thereby preventing the material from flaking off the fabric 100. Although the short fiber third zone 160 is illustrated as a single layer 164, it may also be two, three, or more distinct layers of short fiber material. The short fiber layer 164 may be wood pulp or staple fibers, or a mixture of both. The third layer 164 provides absorbency and softness to the fabric 100. Although five distinct layers 124, 128, 144, 148, and 164 are present in the fabric 100, some intermingling may occur between the different layers 124, 128, 144, 148, and 164.

The first and second spunbond web layers 124 and 144 may have a basis weight from about 12 gsm about 34 gsm. Moreover, the spunbond web layers 124 and 144 may have a basis weight from about 14 gsm to about 27 gsm. The short fiber layer 164 may have a basis weight from about 28 gsm to about 165 gsm. Furthermore, the short fiber layer 164 may have a basis weight from about 90 gsm to about 113 gsm. In addition, the first and second meltblown web layers 128 and 148 may have a basis weight from about 2 gsm to about 34 gsm. Furthermore, the meltblown web layers 128 and 148 may have a basis weight from about 7 gsm to about 20 gsm.

Alternatively, the synthetic fiber structure layers, namely layers 124, 128, 144, and 148, may range from about 13 to about 71 weight percent of the total fabric weight 100, and correspondingly, the short fiber layer 164 may range from about 87 to about 29 weight percent of the total fabric weight 100. Moreover, the layers 124, 128, 144, and 148 may range from about 15 to about 66 weight percent of the total fabric weight 100, and correspondingly, the short fiber layer 164 may range from about 85 to about 34 weight percent of the total fabric weight 100. Furthermore, the layers 124, 128, 144, and 148 may range from about 30 to about 45 weight percent of the total fabric weight 100, and correspondingly, the short fiber layer 164 may range from about 70 to about 55 weight percent of the total fabric weight 100.

In addition, the present invention contemplates varying the weight percent between the spunbond and meltblown layers 124, 128, 144, and 148 in the zones 120 and 140 of the fabric 100. The spunbond layers 124 and 144 may range from about 83 to about 57 weight percent of the zones 120 and 140 weight, and correspondingly, the meltblown web layers 128 and 148 may range from about 17 to about 43 weight percent of the zones 120 and 140 weight. Furthermore, the layers 124 and 144 may range from about 75 to about 67 weight percent of the zones 120 and 140 weight, and correspondingly, the meltblown web layers 128 and 148 may range from about 25 to about 33 weight percent of the zones 120 and 140 weight. Also, the total basis weight of the fabric 100 may range from about 60 gsm to about 250 gsm. In addition, the total basis weight of the fabric 100 may range from about 90 gsm to about 150 gsm.

The synthetic fiber structure zones 120 and 140 may include admixtures of other materials, such as short fibers, long fibers, synthetic fibers, natural fibers, particulates, binders, and fillers. Furthermore, the short fiber zone 160 may include admixtures of other materials, such as long fibers generally having a length greater than 0.01 meter, synthetic fibers, natural fibers, particulates, binders, and fillers.

Both fabrics 10 and 100 may be used in various applications, but may be particularly useful as launderable industrial wipers, coverstock materials, and garment materials. In addition, although these particular combinations of spunbond, meltblown, and short fiber layers have been disclosed for fabrics 10 and 100, it should be understood that other layer combinations may be used, as described in further detail hereinafter.

Figure 4:
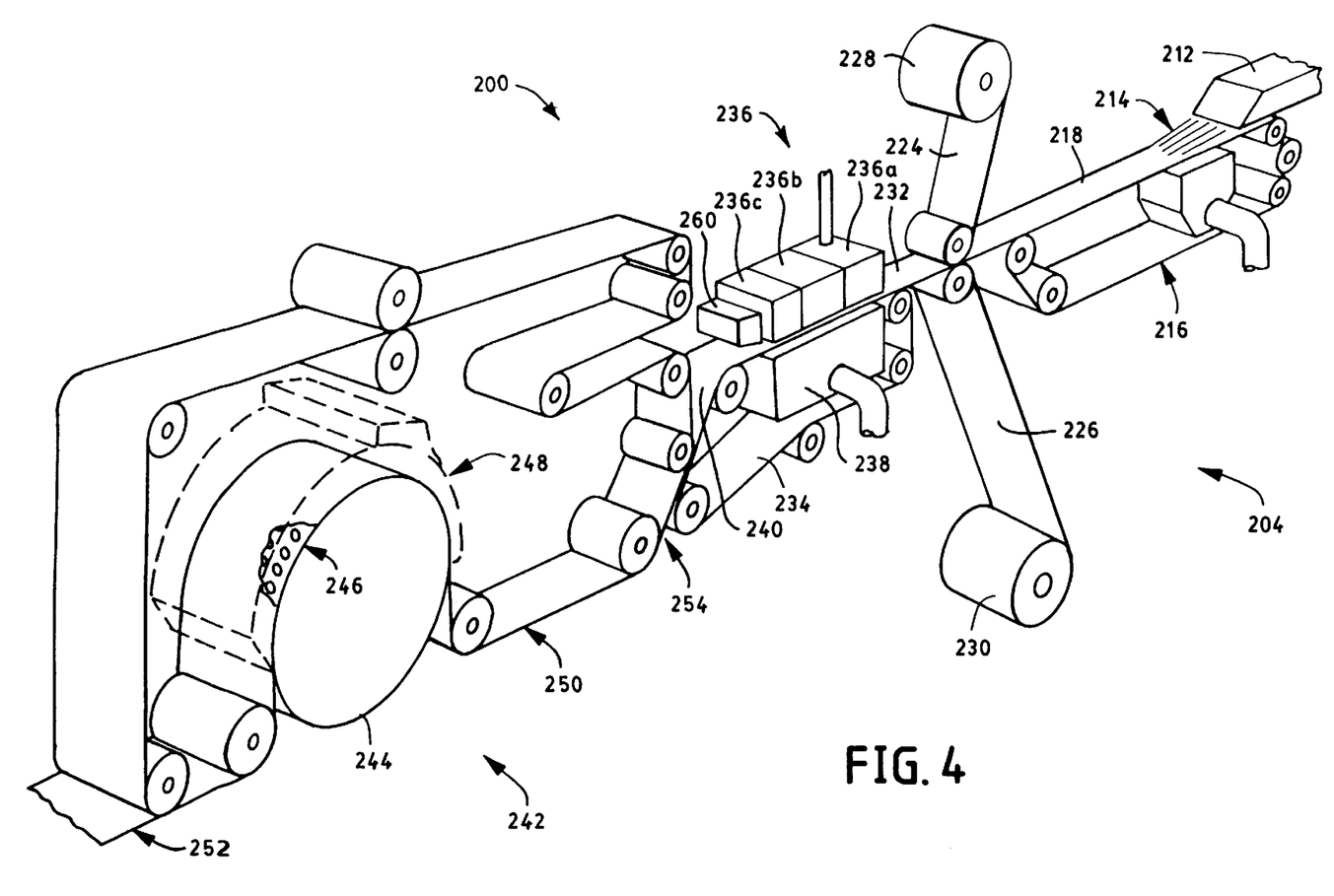
FIG. 4 is an illustration of an exemplary process for making a hydraulically entangled composite fabric.

One embodiment of the process for producing either fabric 10 or 100 is illustrated in FIG. 4. The process 200 may include a web forming and hydroentangling apparatus 204 and a drying apparatus 242. The apparatus 204 includes a headbox 212 for providing short fiber material such as cellulosic material 218, supply rolls 228 and 230, a foraminous fabric 234, a manifold unit 236, and a vacuum apparatus 238.

The cellulosic material 218 may be various wood or nonwood pulps. Suitable cellulosic material may include northern or southern softwood krafts, southern pines, red cedar, hemlock, eucalyptus, black spruce, and mixtures thereof. Exemplary commercially available cellulosic fibers suitable for the present invention include those available from the Kimberly-Clark Corporation of Dallas, Texas under the trade designation Longlac-19 (LL-19). LL-19 is fully bleached northern softwood kraft pulp (approximately 95% by weight spruce) with a trace amount of fully bleached northern hardwood (mainly aspen). The average fiber length of LL-19 is approximately 1.07 millimeters. Desirably, suitable cellulosic materials would be either 100 percent Longlac-19 or a mixture of 50 weight percent Longlac-19 and 50 weight percent southern softwood kraft. The cellulose fibers may be modified by such treatments as, for example, thermal, chemical and/or mechanical treatments. It is contemplated that reconstituted and/or synthetic cellulose fibers may be used and/or blended with other cellulose fibers of the fibrous cellulosic material. Fibrous cellulosic materials may also be composite materials containing cellulosic fibers and one or more non-cellulosic fibers. Moreover, particulates such as superabsorbents, elastic fibers, splittable fibers, monocomponent filaments, or plurality component filaments, may be incorporated into the cellulosic materials. In addition, staple fibers, thermoplastic materials, or latexes may be added for increasing abrasion resistance. A description of a fibrous cellulosic composite material may be found in, for example, U.S. Pat. No. 5,284,703.

The cellulosic material 218 may have a basis weight from about 28 gsm to about 165 gsm. Furthermore, the cellulosic material 218 may have a basis weight from about 80 gsm to about 131 gsm.

Pulp fibers used for the cellulosic material 218 may be unrefined or may be beaten to various degrees of refinement. Small amounts of wet-strength resins and/or resin binders may be added to improve strength and abrasion resistance. Useful binders and wet-strength resins include, for example, KYMENE 557 H resin available from the Hercules Chemical Company and PAREZ 631 resin available from American Cyanamid, Inc. Cross-linking agents and/or hydrating agents may also be added to pulp fibers. Debonding agents may be added to the pulp mixture to reduce the degree of paper bonding if a very open or loose nonwoven fibrous web is desired. One exemplary debonding agent is available from the Quaker Chemical Company, Conshohocken, Pennsylvania, under the trade designation QUAKER 2008.

The supply rolls 228 and 230 may feed synthetic fiber structure zones 224 and 226 to the apparatus 204. The material may be a spunbond web, such as spunbond web manufactured by the Kimberly-Clark Corporation, or a composite of a spunbond/meltblown web, as previously described for the fabric 100.

Referring to FIG. 4, the synthetic fiber structure zones 224 and 226 may be formed by known continuous filament nonwoven extrusion processes, such as, for example, known solvent spinning or melt-spinning processes, and passed directly through without first being stored on the supply rolls 228 or 230. The continuous filament nonwoven substrate 226 is preferably a nonwoven web of continuous melt-spun filaments formed by the spunbond process. The spunbond filaments may be formed from any melt-spinnable polymer, co-polymers or blends thereof. For example, the spunbond filaments may be formed from polyolefins, polyamides, polyesters, polyurethanes, A-B and A-B-A' block co-polymers where A and A' are thermoplastic endblocks and B is an elastomeric midblock, and copolymers of ethylene and at least one vinyl monomer such as, for example, vinyl acetates, unsaturated aliphatic monocarboxylic acids, and esters of such monocarboxylic acids. The polymers may incorporate additional materials such as, for example, pigments, antioxidants, flow promoters, stabilizers and the like.

The filaments may be formed from bicomponent or multicomponent materials, desirably in a sheath/core arrangement, which may prevent crimping. Desirably the filaments of the present invention are uncrimped to enhance abrasive resistance of the outer layers.

If the filaments are formed from a polyolefin, the nonwoven substrate 226 may have a basis weight from about 12 gsm to about 34 gsm. More particularly, the nonwoven substrate 226 may have a basis weight from about 10 gsm to about 35 gsm.

One characteristic for improving abrasion resistance of the nonwoven continuous filament substrate 226 is that it has a total bond area of less than about 30 percent and a uniform bond density greater than about 155000 bonds per square meter. Having a bond area less than 30 percent permits hydroentangling with the cellulosic material while having a bond density greater than about 155000 bonds per square meter helps bond loose fibers, thereby improving abrasion resistance. For example, the nonwoven continuous filament substrate 226 may have a total bond area from about 2 percent to about 30 percent (as determined by conventional optical microscopic methods) and a bond density from about 387000 to about 775000 pin bonds per square meter.

Figure 9:
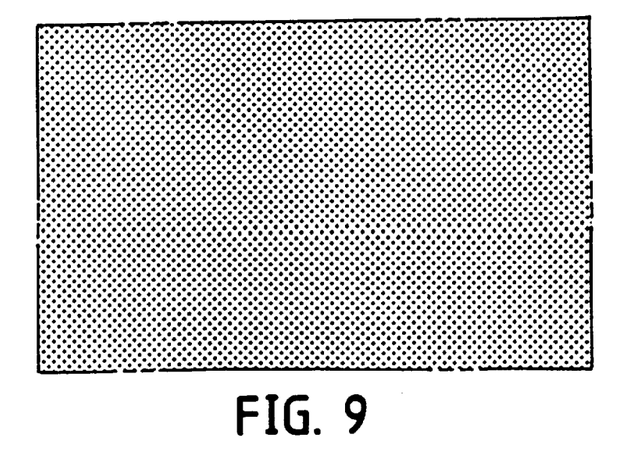
FIG. 9 is a plan view of an exemplary bond pattern.
Figure 10:
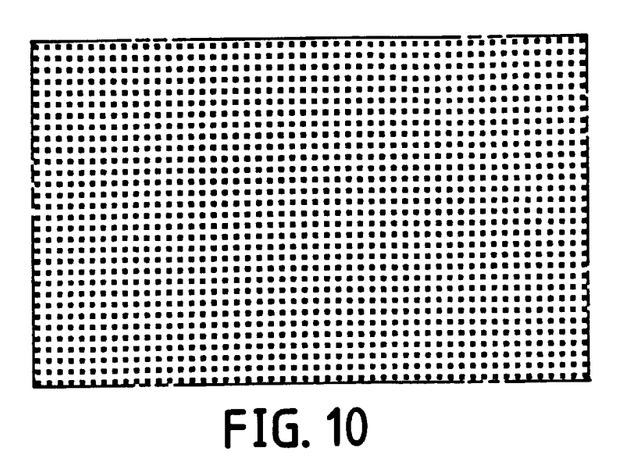
FIG. 10 is a plan view of an exemplary bond pattern.
Figure 11:
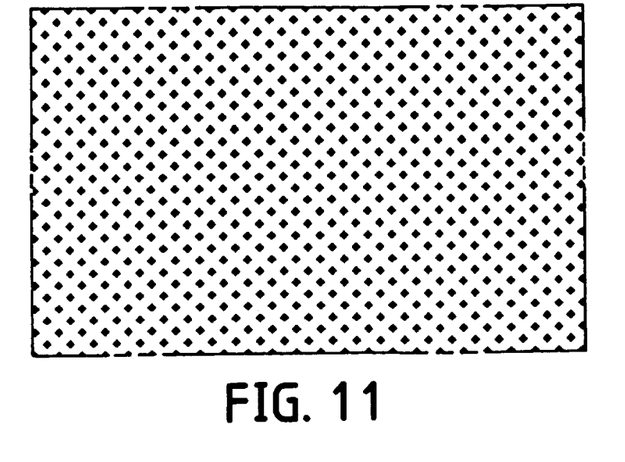
FIG. 11 is a plan view of an exemplary bond pattern.

Such a combination of the total bond area and bond density may be achieved by bonding the continuous filament substrate 226 with a pin bond pattern having more than about 155000 bonds per square meter which provides a total bond surface area of less than about 30 percent when fully contacting a smooth anvil roll. Desirably, the bond pattern may have a pin bond density from about 387000 to about 542000 pin bonds per square meter and a total bond surface area from about 10 percent to about 25 percent when contacting a smooth anvil roll. An exemplary bond pattern is shown in FIG. 9. That bond pattern has a pin density of about 474000 pins per square meter. Each pin defines square bond surface having sides which are about 0.00064 meter in length. When the pins contact a smooth anvil roller they create a total bond surface area of about 15.7 percent. High basis weight substrates generally have a bond area which approaches that value. Lower basis weight substrates generally have a lower bond area. FIG. 10 is another exemplary bond pattern. The pattern of FIG. 10 has a pin density of about 431000 pins per square meter. Each pin defines a bond surface having 2 parallel sides about 0.00089 meter long (and about 0.00051 meter apart) and two opposed convex sides each having a radius of about 0.00019 meter. When the pins contact a smooth anvil roller they create a total bond surface area of about 17.2 percent. FIG. 11 is another bond pattern which may be used. The pattern of FIG. 11 has a pin density of about 160000 pins per square meter. Each pin defines a square bond surface having sides which are about 0.0011 meter in length. When the pins contact a smooth anvil roller they create a total bond surface area of about 16.5 percent.

Although pin bonding produced by thermal bond rolls is described above, the present invention contemplates any form of bonding which prevents loose filaments with minimum overall bond area. For example, thermal bonding and/or latex impregnation may be used to provide desirable filament tie down with minimum bond area. In addition, thermal bonding may include the use of melt-fusable thermoplastic fibers. Alternatively and/or additionally, a resin, latex or adhesive may be applied to the nonwoven continuous filament web by, for example, spraying or printing, and dried to provide the desired bonding.

The foraminous fabric 234 may be formed from a variety of sizes and configurations including a single plane mesh having a mesh size from about 4 wires per centimeter (hereinafter may be abbreviated as "cm") by about 4 wires per centimeter to about 50 wires per centimeter by about 50 wires per centimeter. Also, the foraminous fabric 234 may be constructed from a polyester material. Seven exemplary forming fabrics are manufactured by Albany Engineer Fabric Wire under the trade designations 14C, 16C, 20C, 103-AM, 12C, 90BH, and FT-14 fabrics. The properties of these seven fabrics are depicted below in Table 1.

TABLE 1

Fabric Properties

| Trade Designation | Mesh (approximate wires per cm (both sides)) | Warp (millimeter) | Chute (millimeter) | Nominal Caliper (approximate in cm) | Nominal Air Perm (approximate in meter cubed per minute) | Open Area (percent) |
|---|---|---|---|---|---|---|
| 14C | 5.5 by 5.1 | 0.57/0.88 | 0.89 | 0.145 | 20.5 | 27.8 |
| 16C | 6.3 by 5.5 | 0.81 | 0.89 | 0.165 | | 25.0 |
| 20C | 7.9 by 6.3 | 0.70 | 0.70 | 0.123 | 14.4 | 25.1 |
| 103-AM | 40.6 by 31 | 0.15 | 0.20 | 0.030 | 6.94 | 15.1 |
| 12C | 4.7 by 5.5 | 0.71 | 0.76 | 0.148 | 33.7 | 38.6 |
| 90BH | 35 by 20 | 0.17 | 0.25 | 0.046 | 15.0 | 21.0 |
| FT-14 | 5.5 by 5.1 | 0.57/0.88 | 0.89 | 0.145 | 20.3 | 27.8 |

The manifold unit 236 includes three manifolds 236a–c, capable of producing columnar jets, although other numbers of manifolds may be used. Each manifold 236a–c may contain one row of orifices where the orifices may be spaced about 16 orifices per centimeter. Each orifice is about 0.15 millimeter in diameter. The manifolds 236a–c may be obtained by Valmet Honeycomb Incorporated, Biddeford, Maine.

According to the present invention illustrated in FIG. 4, a short fiber suspension, such as pulp, supplied by the headbox 212 via a sluice 214 is deposited onto a forming fabric 216. The suspension may be diluted to any consistency that is typical in conventional papermaking processes. As an example, the suspension may contain from about 0.1 to about 1.5 weight percent pulp fibers. Removing water from the suspension forms a uniform zone or layer of cellulosic material 218. The cellulosic material 218 is then placed between two synthetic fiber structure zones or layers 224 and 226, which are unwound from supply rolls 228 and 230 respectively, thereby forming a structure 232.

After forming the structure 232, it is laid on the foraminous fabric 234 for hydroentangling. Hydroentangling processes are known in the art, and as an example, U.S. Pat. No. 3,485,706, to Evans discloses a suitable hydroentangling process, which is hereby incorporated by reference.

Treating the structure 232 with jets of fluid, typically water, from the manifold unit 236 entangles the layers of structure 232. The water exiting the orifices of the manifold unit 236 ranges from about 7,000,000 Pascals to about 34,000,000 Pascals. Alternatively, the water may be from about 11,000,000 to about 12,000,000 Pascals. The foraminous fabric 234 and forming fabric 216 may travel from about 0.91 meter per minute to about 610 meter per minute. At the upper ranges of the described pressures, it is contemplated that the composite fabrics may be processed at the higher speeds. Alternatively, the fabric 234 and the fabric 216 may travel from about 0.91 meter per minute to about 16.4 meter per minute.

The fluid jets entangle and interlock the synthetic fiber structure zones 224 and 226, along with the short fiber or cellulosic material layer 218, which are supported by the foraminous fabric 234. A vacuum apparatus 238 placed directly underneath the formaminous fabric 234 at the manifold unit 236 withdraws fluid from the hydroentangled fabric 240.

Although FIG. 4 illustrates only hydroentangling one side of the structure 232 to form the fabric 240, it is desired to hydroentangle both sides. As an example, U.S. Pat. No. 5,587,225, to Griesbach et al., describes such a process and is hereby incorporated by reference. The second side of the fabric 240 may be hydroentangled at similar process conditions as the previously described first side.

If desired, dyeing may be done inline, such as with pulper dyeing, which may also be used to apply softeners, or a vacuum saturation applicator 260, such as the apparatus and process disclosed in U.S. Pat. No. 5,486,381 to Cleveland et al. and U.S. Pat. No. 5,578,124 to Cleveland et al., which are hereby incorporated by reference. Furthermore, colored zones 224 and 226 may be used in conjunction with or exclusive of the inline dyeing.

After inline dyeing, the hydraulically entangled fabric 240 may be transferred by a differential speed pickup roll 254 to the drying apparatus 242. One desirable drying apparatus is a conventional through-air drying rotary drum. Alternatively, conventional vacuum-type pickups and transfer fabrics may be used. If desired, the fabric 240 may be wet-creped before being transferred to the drying operation. The drying apparatus 242 may be an outer rotatable cylinder 244 with perforations 246 in combination with an outer hood 248 for receiving hot air blown through the perforations 246. A through-dryer belt 250 carries the fabric 240 over the upper portion of the cylinder 244. The heated air forced through the perforations 246 in the outer cylinder 244 removes water from the fabric 240. The temperature of the forced air may range from about 200° to about 500° F. Other useful through-drying methods and apparatus may be used, for example, those methods and apparatuses described in U.S. Pat. Nos. 2,666,369 and 3,821,068, which are hereby incorporated by reference. It is contemplated that compressive drying operations may be used to dry the fabric 240 as well.

Furthermore, other exemplary drying apparatuses and methods may be used, such as infra-red radiation, Yankee dryers, steam cans, vacuum de-watering, microwaves, and ultrasonic energy.

One desirable feature of the present invention is producing a three-zoned or layered fabric without additional bonding after hydroentangling. Although the inventors should not be held to a particular theory of operation, it is believed that the high strength of the synthetic fiber structure zones, which may be prebonded thermally or chemically prior to hydroentangling, permits rigorous high pressure hydroentangling. Rigorous hydroentangling results in high bonding between the various zones, which avoids the necessity of post-bonding procedures.

It may be desirable to use finishing steps and/or post treatment processes to impart selected properties to the dried composite fabric 252. As an example, the fabric 252 may be lightly or heavily pressed by calender rolls, creped or brushed to provide a uniform exterior appearance and/or certain tactile properties. Alternatively and/or additionally, chemical post-treatments, such as adhesives or dyes, may be added to the fabric 252. It is contemplated that the composite fabric 252 may be saturated or impregnated with latexes, emulsions, flame retardants, and/or bonding agents. As an example, the composite fabric 252 may be treated with a heat activated bonding agent.

In one aspect of the invention, the fabric 240 may contain various materials, such as activated charcoal, clays, starches, and superabsorbent materials. As an example, these materials may be added to the suspension of cellulosic material 218. These materials may also be deposited directly on the synthetic fiber structure zones or on the layer of cellulosic material 218 prior to the fluid jet treatments, incorporating them into the fabric 240 by the action of the fluid jets. Alternatively and/or additionally, these materials may be added to the composite fabric after the fluid jet treatments. If superabsorbent materials are added to the suspension of fibrous material or to the layer of fibrous material before water-jet treatments, it is desired that the superabsorbents are those which can remain inactive during the wet-forming and/or water-jet treatment steps and can be activated later, such as those disclosed in U.S. Pat. No. 3,563,241 to Evans et al., which is hereby incorporated by reference. Superabsorbents, such as those disclosed in U.S. Pat. No. 5,328,759 to McCormack et al. hereby incorporated by reference, may be added to the composite fabric after the water-jet treatments immediately before drying.

FIGS. 5–8 schematically illustrate various hydroentangling methods of creating fabrics. The following processes may use the same equipment as described for the process 200, except where otherwise noted. As an example, each manifold unit hereinafter described desirably includes three manifolds as previously described for the process 200. Although most components, such as headboxes, and forming and formaminous fabrics are not shown, these processes are readily reproducible by one of ordinary skill in the art in light of the present disclosure. In addition, although more than one short fiber layer may be hereinafter described, the overall ratio of short fiber content to synthetic fiber content is about the same as previously described for fabrics 10 and 100. Furthermore, the hereinafter described processes' forming and foraminous fabrics are desirably operated at from about 0.91 meter per minute to about 16.4 meter per minute, although higher speeds are contemplated depending upon the fluid pressure of the manifold units. In addition, all post hydroentangling operations and modifications, such as drying and embossing, described for process 200 may be used for the following processes as well.

Figure 5:
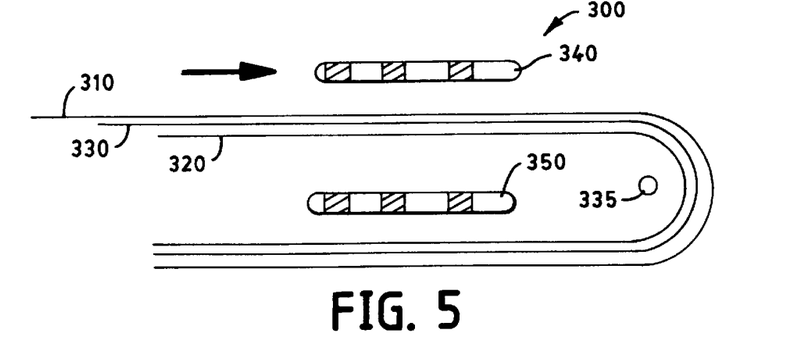
FIG. 5 is a schematic illustration of one embodiment of a process for making a hydraulically entangled composite fabric including three layers.

Referring to FIG. 5, a hydroentangling process 300 may include hydroentangling a synthetic fiber structure first layer 310, a synthetic fiber structure second layer 320, and a short fiber third layer 330. These layers 310, 320, and 330 may be combined to form a composite and then passed by a manifold unit 340 and hydroentangled with a fluid ranging from about 11,000,000 Pascals to about 12,000,000 Pascals. After one side of the composite is hydroentangled, the layers 310, 320, and 330 may be passed by a roller 335, thereby exposing the second side of the composite to a manifold unit 350. The second side may be hydroentangled with a fluid ranging from about 11,000,000 Pascals to about 12,000,000 Pascals. Alternatively to processing the layers 310, 320, and 330 continuously, these layers may be processed in batch steps, as previously described for the process 200. This process 300 may produce a fabric having two synthetic fiber structure layers or zones 310 and 320 sandwiching a short fiber layer or zone 330.

Figure 6:
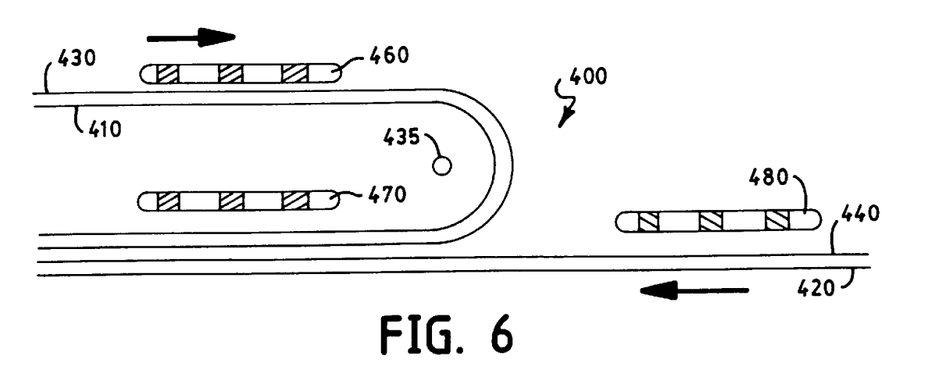
FIG. 6 is a schematic illustration of a second embodiment of a process for making a hydraulically entangled composite fabric including four layers.

Referring to FIG. 6, a hydroentangling process 400 may include hydroentangling a synthetic fiber structure first layer 410, a synthetic fiber structure second layer 420, a short fiber third layer 430, and a short fiber fourth layer 440. The layers 420 and 440 may be passed by a manifold unit 480 and hydroentangled with a fluid at about 9,100,000 Pascals. In addition, the layers 410 and 430 may be passed by a manifold unit 460 and hydroentangled with a fluid at about 9,100,000 Pascals. Afterward, the hydroentangled layers 410 and 430 may be passed by a roller 435 to place the layer 430 adjacent to the layer 440. Next, the layers 410, 420, 430, and 440 may be passed by a manifold unit 470, hydroentangling these layers 410, 420, 430, and 440 with a fluid ranging from about 11,000,000 Pascals to about 12,000,000 Pascals. This process 400 may form a fabric having two synthetic fiber layers or zones 410 and 420 sandwiching two short fiber layers 430 and 440, which form a single short fiber zone. Although this process 400 has been described using three manifold units 460, 470, and 480 to continuously process the layers 410, 420, 430, and 440, it should be understood that, alternatively, these layers may be processed in batch stages.

Figure 7:
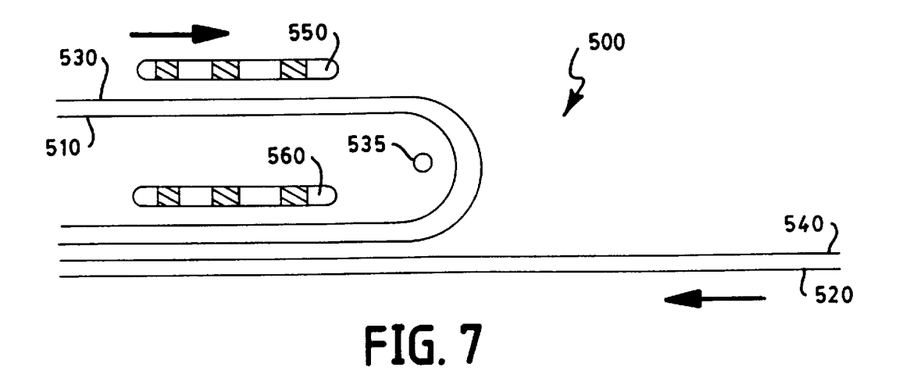
FIG. 7 is a schematic illustration of a third embodiment of a process for making a hydraulically entangled composite fabric including four layers.

Referring to FIG. 7, a hydroentangling process 500 may include hydroentangling a synthetic fiber structure first layer 510, a synthetic fiber structure second layer 520, a short fiber third layer 530, and a short fiber fourth layer 540. The layers 510 and 530 may be passed by a manifold unit 550 and hydroentangled with a fluid at about 9,100,000 Pascals. Afterward, the hydroentangled layers 510 and 530 may be passed by a roller 535 to place the layer 530 adjacent to the layer 540. Next, the layers 510, 520, 530, and 540 may be passed by a manifold unit 560, thereby hydroentangling these layers 510, 520, 530, and 540 with a fluid ranging from about 11,000,000 Pascals to about 12,000,000 Pascals. This process 500 may form a fabric having two synthetic fiber structure layers or zones 510 and 520 sandwiching two short fiber layers 530 and 540, which form a short fiber zone. Although this process 500 has been described using two manifold units 550 and 560 to continuously process the layers 510, 520, 530, and 540, it should be understood that, alternatively, these layers may be processed in batch stages.

Figure 8:
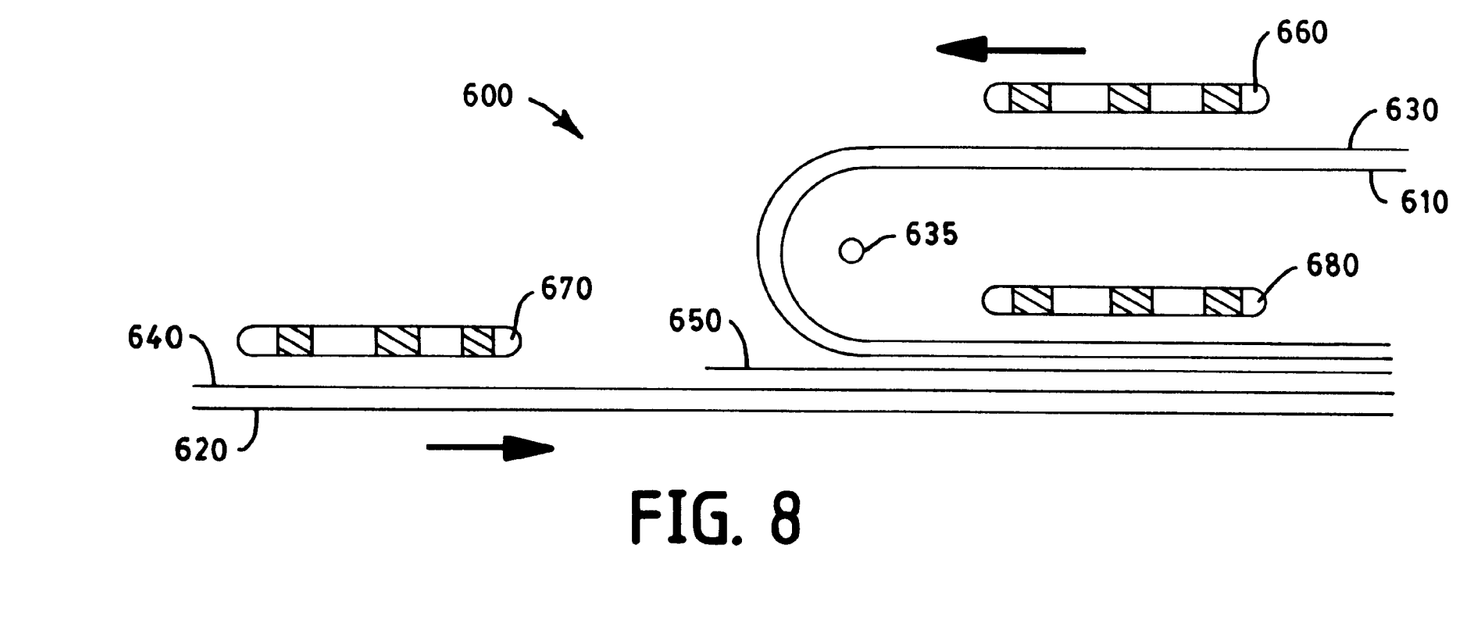
FIG. 8 is a schematic illustration of a fourth embodiment of a process for making a hydraulically entangled composite fabric including five layers.

Referring to FIG. 8, a hydroentangling process 600 may include hydroentangling a synthetic fiber structure first layer 610, a synthetic fiber structure second layer 620, a short fiber third layer 630, a short fiber fourth layer 640, and a short fiber layer fifth layer 650. The layers 620 and 640 may be passed by a manifold unit 670 and hydroentangled with a fluid at about 9,100,000 Pascals. In addition, the layers 610 and 630 may be passed by a manifold unit 660 and hydroentangled with a fluid at about 9,100,000 Pascals. Afterward, the hydroentangled layers 610 and 630 may be passed by a roller 635, inverting the these layers 610 and 630. A fifth short fiber layer 650 may be deposited onto the fourth layer 640. The inverted layers 630 and 610 are combined with the layers 620, 640, and 650. Next, the layers 610, 620, 630, 640, and 650 may be passed by a manifold 680, hydroentangling these layers 610, 620, 630, 640, and 650 with a fluid ranging from about 11,000,000 Pascals to about 12,000,000 Pascals. This process 600 may form a fabric having two synthetic fiber structure layers or zones 610 and 620 sandwiching three short fiber layers 630, 640, and 650, which may form a single short fiber zone. Although this process 600 has been described using three manifold units 660, 670, and 680 to continuously process the layers 610, 620, 630, 640, and 650, it should be understood that, alternatively, these layers may be processed in batch stages.

TESTS

Tests were conducted on fabrics produced by the present invention. One test measured the abrasion resistance, which was conducted on a TABER ABRASION TESTER manufactured by Taber Industries of North Tanawanda, N.Y.

Samples were tested either dry and/or wet. Dry samples were tested at room conditions and wet samples were saturated with water, blotted dry, and tested immediately.

Table 2 (attached to the end of the specification) depicts data from fabrics having three layers, namely spunbond-pulp-spunbond, produced by the process 200 previously described. Each data point in Table 2 represents the mean of four samples.

The test procedure included running each sample for fifty cycles with the wheel operated at about 72 revolutions per minute. The wheel was a H-18 stone abrader wheel and no counterweights were used. After testing four samples, the wheels on the TABER ABRASION TESTER were changed with a clean wheel. Abraded samples were rated on a scale of 1 to 5 with 5 being essentially no wear by comparing to standardized photos. Referring to Table 2, most of the tested samples had a Taber resistance of 3 or more, thus illustrating substantial durability.

In addition, several other samples were taken and laundered to test their durability. These samples were laundered according to ASTM D-2724-87 washing and drying procedures except about 0.25 liter of CLOROX bleach was added to the wash cycles. In addition, the samples were washed at about 54° C. for about 8 minutes, and afterwards, were dried for 20 about 30 minutes. Each sample is depicted in Table 3.

TABLE 3

| | Basis Weight (gsm) | | | | Sample Weight (grams) | | | | |
|---|---|---|---|---|---|---|---|---|---|
| Sample Number | Spunbond (both layers) | Pulp (Nominal) | Total | Original | After 1 Wash & Dry | After 2 Wash & Dry | After 3 Wash & Dry | After 4 Wash & Dry | After 5 Wash & Dry |
| 1 | 28 | 96 | 136 | 16.6 | 16.2 | 16.1 | 16.1 | 16.0 | 16.0 |
| 2 | 28 | 96 | 125 | 18.9 | 18.4 | 18.1 | 18.0 | 17.9 | 17.8 |
| 3 | 28 | 96 | 110 | 15.7 | 15.3 | 15.2 | 15.0 | 15.0 | 15.0 |
| 4 | 40 | 113 | 150 | 18.7 | 18.2 | 18.4 | 18.0 | 18.1 | 17.9 |
| 5 | 40 | 113 | 140 | 18.7 | 18.2 | 18.1 | 17.9 | 17.9 | 17.8 |
| 6 | 40 | 113 | 150 | 20.3 | 19.7 | 19.7 | 19.5 | 19.3 | 19.3 |

As depicted in Table 3, the most weight lost after 5 washing and drying cycles is less than about 6 percent of the original sample weight. Accordingly, these samples are illustrative of the durability of the three-layered fabric.

Table 4 depicts data from fabrics having four layers, namely spunbond-pulp-pulp-spunbond, produced by the process 400 as previously described. The Taber Abrasion testing was conducted in substantially the same manner as the three- layered fabric samples.

TABLE 4

| BASIS WEIGHT (gsm) | | | Forming | Pressure Entangle Jet - 1st & 2nd | Pressure Entangle Jet - 3rd Pass | TABER ABRASION (Wet) | |
|---|---|---|---|---|---|---|---|
| Spunbond (both layers) | Pulp (Nominal) | Total | Fabric Speed (m/min) | Pass On 2 Layers (kPa) | On 4 layers (kPa) | 1st Side | 2nd Side |
| 40 | 82 | 122 | 7.9 | 7700 | 8400 | 3.0 | 4.0 |
| 40 | 82 | 122 | 7.9 | 7700 | 9800 | 5.0 | 4.0 |

TABLE 4-continued

| BASIS WEIGHT (gsm) | | | Forming Fabric Speed | Pressure Entangle Jet - 1st & 2nd Pass On 2 Layers | Pressure Entangle Jet - 3rd Pass On 4 layers | TABER ABRASION (Wet) | |
|---|---|---|---|---|---|---|---|
| Spunbond (both layers) | Pulp (Nominal) | Total | (m/min) | (kPa) | (kPa) | 1st Side | 2nd Side |
| 40 | 82 | 122 | 7.9 | 7700 | 11000 | 4.0 | 4.0 |
| 40 | 82 | 122 | 7.9 | 7700 | 11000 | 5.0 | 5.0 |

As previously described, it is believed that the high strength of the pre-bonded synthetic fiber structure zones permits rigorous hydroentangling. Several tests were conducted on an exemplary fiber zone, which in this experiment were two spunbond layers. The tests included trap tear, tensile modulus, and Taber Abrasion. Each data point depicted in Tables 5–7 represents the mean of four samples. The trap tear and tensile modulus tests were conducted using wet and dry samples. Wet samples were saturated with purified water and the excess blotted prior to clamping into the apparatuses. Conversely, the dry samples were not saturated with water, but were conditioned for approximately 12 hours at 23 degrees Centigrade at 50% relative humidity prior to testing.

The trap tear test measures the toughness of a material by measuring the material resistance to tear propagation under a constant rate of extension of about 30 centimeter per minute. For the following depicted data, the material was cut into trapezoidal sized samples having parallel sides of 7.6 centimeter and 15 centimeter. This trapezoidal cutting procedure deviated from TAPPI method T 494 om-88. After cutting about 1.6 centimeter at about the middle of the about 7.6 centimeter side, the nonparallel sides of the trapezoidal shaped specimen were clamped. Pulling caused a tear to propagate in the specimen perpendicular to the load. The test was conducted using a SINTECH 2S TENSILE TESTER manufactured by Sintech Corporation of 1001 Sheldon Drive, Cary, N.C. 27513.

The tensile strength and stretch test measures the toughness of a material by pulling at a constant extension rate ranging from about 290 millimeter per minute to about 310 millimeter per minute until the material breaks. This test was conducted utilizing a SINTECH 2S TENSILE TESTER manufactured by Sintech Corporation of 1001 Sheldon Drive, Cary, N.C. 27513. The test procedure included securing a sample at either end in the cross direction with about 10.16 centimeter clamps and stretching at a rate of about 25.40 centimeter per minute until the sample breaks. Each sample had a machine direction length of about 15.24 centimeters and a cross direction width of about 2.54 centimeters. This testing procedure obtained data regarding tensile modulus and percent stretch. The percent stretch was expressed as a percentage of the gauge length at peak load.

The tensile and trap tear strengths were reported in units of gram-force, which may be hereinafter abbreviated as "$g_f$". Results of the above tests of the two prebonded synthetic fiber zones in the machine direction are depicted in Table 5.

TABLE 5

| Basis Weight (gsm) | Tensile - MD Dry ($g_f$) | Tensile - MD Dry (% Stretch) | Tensile - MD Wet ($g_f$) | Tensile - MD Wet (% Stretch) | Trap Tear Strength - MD Wet ($g_f$) |
|---|---|---|---|---|---|
| 55.4 | 3769 | 44 | 3562 | 41 | 3992 |

Results of the above tests in the cross direction are depicted in Table 6.

TABLE 6

| Basis Weight (gsm) | Tensile - CD Dry ($g_f$) | Tensile - CD Dry (% Stretch) | Tensile - CD Wet ($g_f$) | Tensile - CD Wet (% Stretch) | Trap Tear Strength - CD Wet ($g_f$) |
|---|---|---|---|---|---|
| 55.4 | 1908 | 56 | 1836 | 54 | 2585 |

Table 7 depicts wet and dry Taber Abrasion data. The tests were conducted substantially the same as for the three layer fabrics as previously described.

TABLE 7

| Basis Weight (gsm) | Wet Taber Abrasion | Dry Taber Abrasion |
|---|---|---|
| 55.4 | 3.3 | 3.3 |

It is believed that these strength properties of the spunbond layers, as depicted in Tables 5, 6, and 7, result in a fabric having improved abrasion resistance as depicted in Tables 2 and 4.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 2

| APPROXIMATE BASIS WEIGHT (gsm) | | | Forming Fabric Speed (m/min) | Pressure Entangle Jet - 1st Pass (kPa) | Pressure Entangle Jet - 2nd Pass (kPa) | TABER ABRASION | | | |
|---|---|---|---|---|---|---|---|---|---|
| Spunbond (both layers) | Nominal Pulp | Total | | | | WET | | DRY | |
| | | | | | | 1st Side | 2nd Side | 1st Side | 2nd Side |
| 56 | 131 | 190 | 6.6 | 9700 | 9700 | 3.4 | 4.3 | | |
| 56 | 131 | 187 | 6.6 | 11000 | 11000 | 3.4 | 3.4 | | |
| 56 | 131 | 182 | 6.6 | 12000 | 12000 | 4.7 | 3.9 | | |
| 40 | 110 | 150 | 6.2 | 12000 | 7000 | 5.0 | 1.0 | | |
| 40 | 110 | 150 | 6.2 | 12000 | 7700 | 4.5 | 1.0 | | |
| 40 | 110 | 150 | 6.2 | 12000 | 8400 | 5.0 | 1.0 | | |
| 40 | 110 | 150 | 6.2 | 12000 | 9100 | 4.0 | 2.0 | | |
| 40 | 110 | 150 | 6.2 | 12000 | 9800 | 4.5 | 2.0 | | |
| 40 | 110 | 150 | 6.2 | 12000 | 10000 | 4.0 | 2.5 | | |
| 40 | 110 | 150 | 6.2 | 12000 | 11000 | 4.5 | 3.0 | | |
| 40 | 110 | 150 | 6.2 | 12000 | 12000 | 4.5 | 4.5 | | |
| 57 | 125 | 184 | 7.3 | 7000 | 12000 | 4.3 | 4.7 | 3.7 | 4.3 |
| 57 | 125 | 182 | 7.3 | 8400 | 12000 | 4.3 | 4.3 | 4.7 | 4.7 |
| 57 | 125 | 183 | 7.3 | 9800 | 12000 | 4.7 | 5.0 | 4.3 | 4.0 |
| 57 | 125 | 177 | 7.3 | 11000 | 12000 | 4.3 | 5.0 | 4.3 | 4.3 |
| 57 | 125 | 173 | 7.3 | 13000 | 12000 | 5.0 | 5.0 | 4.0 | 4.0 |
| 57 | 125 | 181 | 7.3 | 12000 | 12000 | 4.0 | 4.0 | | |
| 57 | 125 | 186 | 7.3 | 7000 | 12000 | 3.5 | 3.0 | | |
| 57 | 125 | 182 | 7.3 | 8400 | 12000 | 3.5 | 3.0 | | |
| 57 | 125 | 182 | 7.3 | 9800 | 12000 | 3.5 | 4.0 | | |
| 57 | 125 | 176 | 7.3 | 11000 | 12000 | 3.0 | 3.5 | | |
| 57 | 125 | 174 | 7.3 | 13000 | 12000 | 3.0 | 4.0 | | |
| 57 | 125 | 193 | 7.3 | 7000 | 8400 | 5.0 | 5.0 | 3.0 | 3.0 |
| 57 | 125 | 185 | 7.3 | 7000 | 9800 | 5.0 | 4.7 | 3.3 | 3.0 |
| 57 | 125 | 189 | 7.3 | 7000 | 11000 | 4.3 | 5.0 | 3.0 | 3.3 |
| 57 | 125 | 182 | 7.3 | 7000 | 13000 | 3.7 | 4.7 | 3.0 | 3.3 |
| 57 | 125 | 179 | 7.3 | 7000 | 14000 | 3.3 | 4.7 | 3.0 | 3.0 |
| 57 | 125 | 191 | 7.3 | 7000 | 8400 | 2.0 | 3.0 | | |
| 57 | 125 | 189 | 7.3 | 7000 | 9800 | 3.0 | 3.0 | | |
| 57 | 125 | 185 | 7.3 | 7000 | 11000 | 3.0 | 3.0 | | |
| 57 | 125 | 183 | 7.3 | 7000 | 13000 | 4.0 | 4.0 | | |
| 57 | 125 | 181 | 7.3 | 7000 | 14000 | 4.0 | 4.0 | | |
| 57 | 125 | 182 | 7.3 | 9800 | 9800 | 3.0 | 4.0 | | |
| 57 | 125 | 176 | 7.3 | 9800 | 11000 | 3.5 | 5.0 | | |
| 57 | 125 | 177 | 7.3 | 9800 | 13000 | 4.0 | 4.5 | | |
| 57 | 125 | 181 | 7.3 | 9800 | 14000 | 4.0 | 3.5 | | |
| 57 | 125 | 188 | 7.0 | 9800 | 8400 | 2.0 | 4.0 | | |
| 57 | 125 | 192 | 7.0 | 9800 | 9800 | 3.0 | 3.5 | | |
| 57 | 125 | 189 | 7.0 | 9800 | 11000 | 3.5 | 4.0 | | |
| 57 | 125 | 192 | 7.0 | 9800 | 13000 | 4.0 | 4.0 | | |
| 57 | 125 | 181 | 7.0 | 9800 | 14000 | 4.0 | 4.0 | | |
| 57 | 125 | 168 | 9.1 | 12000 | 12000 | 4.7 | 3.3 | 3.0 | 3.7 |
| 57 | 125 | 174 | 9.1 | 12000 | 12000 | 4.0 | 4.3 | 3.0 | 3.0 |
| 57 | 125 | 177 | 16.4 | 12000 | 12000 | 4.3 | 4.7 | 3.0 | 3.0 |
| 57 | 100 | 141 | 13.4 | 12000 | 12000 | 4.3 | 4.7 | 3.0 | 3.0 |
| 57 | 75 | 125 | 9.1 | 12000 | 12000 | 4.7 | 5.0 | 3.0 | 3.0 |

What is claimed is:

1. A fabric, comprising:
   a synthetic fiber structure first layer wherein the first layer comprises a spunbond web layer and a meltblown web layer;
   a synthetic fiber structure second layer positioned proximate to the synthetic fiber structure first layer; and
   a short fiber third layer sandwiched between the first and second layers wherein at least a portion of the first and second layers are entwined with the third layer.

2. The fabric of claim 1 wherein the short fiber third layer comprises pulp fibers.

3. The fabric of claim 1 wherein the short fiber third layer comprises staple fibers.

4. The fabric of claim 1 wherein the short fiber third layer comprises pulp fibers and staple fibers.

5. The fabric of claim 1 wherein the second layer comprises a spunbond web layer and a meltblown web layer.

6. The fabric of claim 1 wherein the third layer comprises particulates.

7. The fabric of claim 1 wherein the first and second synthetic fiber structure layers are prebonded prior to being entwined.

8. A fabric, comprising:
   a synthetic fiber structure first layer;
   a synthetic fiber structure second layer positioned proximate to the synthetic fiber structure first layer; and
   a short fiber third layer further comprising a plurality of cellulosic material layers and sandwiched between the first and second layers wherein at least a portion of the first and second layers are entwined with the third layer.

9. A fabric, comprising:
   a synthetic fiber structure first layer;
   a synthetic fiber structure second layer;
   a short fiber third layer sandwiched between the first and second layers wherein at least a portion of the first and second layers are entwined with the third layer and the fabric has a Taber abrasion value of not less than about in substantial accordance with ASTM test procedure D-3884-92.

10. The fabric of claim 9 wherein the short fiber third layer comprises pulp fibers.

11. The fabric of claim 9 wherein the short fiber third layer comprises staple fibers.

12. The fabric of claim 9 wherein the short fiber third layer comprises pulp fibers and staple fibers.

13. The fabric of claim 9 wherein the first layer is a nonwoven web layer.

14. The fabric of claim 9 wherein the short fiber third layer comprises particulates.

15. The fabric of claim 9 wherein the first and second layers are prebonded prior to being entwined.

16. A fabric, comprising:

a synthetic fiber structure first layer further comprising uncrimped fibers;

a synthetic fiber structure second layer positioned proximate to the synthetic fiber structure first layer; and a short fiber third layer sandwiched between the first and second layers wherein a portion of the first and second layers are entwined with the third layer.

17. A fabric, comprising:

a prebonded synthetic fiber structure first layer;

a synthetic fiber structure second layer positioned proximate to the synthetic fiber structure first layer; and a short fiber third layer sandwiched between the first and second layers wherein at least a portion of the first and second layers are entwined with the third layer.

* * * * *